Patented Oct. 5, 1948

2,450,543

UNITED STATES PATENT OFFICE 2,450,543

HERBICIDAL COMPOSITION

Albert L. Flenner, Wilmington, Del., assignor to E. I. du Pont de Nemours & Company, Wilmington, Del., a corporation of Delaware No Drawing. Application March 22, 1945, Serial No. 584,251

3 Claims. (Cl. 167—45)

This invention relates to compositions of matter and particularly to compositions useful as herbicides.

2,4-Dichlorophenoxyacetic acid has been found very useful as a plant regulant herbicide but has been difficult to apply because the minimum practical lethal concentration for many plants at least is greater than its solubility in water. It is an object of this invention, therefore, to provide compositions which avoid the disadvantages of the prior art and are easily and effectively utilizable for the control or destruction of objectionable plants or objectionable plant foliage and to obtain advantages as will appear hereinafter.

These objects are accomplished in the present invention by compositions consisting predominantly of 2,4-dichlorophenoxyacetic acid, a dispersing agent, and mutual solvent therefor. With these compositions it is a simple matter to obtain aqueous dispersions or emulsions containing 2,4-dichlorophenoxyacetic acid in the dispersed phase which are easily applicable to foliage in the usual spray equipment used in applying insecticides and fungicides.

The invention may be more fully understood by reference to the following examples, in which the parts are by weight unless otherwise specified.

Example I

| | Percent |
|---|---|
| 2,4-dichlorophenoxyacetic acid | 10 |
| Cyclohexanone | 30 |
| Solvesso #1[1] | 55 |
| N,N-diethylcyclohexylammonium "Lorol" sulfate[2] | 5 |

[1] Solvesso #1 is a commercial solvent obtained by hydrogenating naphtha.
[2] The term "Lorol" refers to a mixture of alkyl radicals obtained by hydrogenating coconut oil and consists principally of N-dodecyl with minor amounts of other alkyl radicals ranging from C-8 to C-14.

This composition forms a finely divided emulsion when added to water with stirring. It is a true emulsion with the solution of 2,4-dichlorophenoxyacetic acid in the mixed solvent (cyclohexanone and Solvesso #1) as the dispersed phase. It is of particular value as a herbicide in view of the high concentration of 2,4-dichlorophenoxyacetic acid obtainable in the dispersed phase. The two solvents mutually cooperate to give unusually high cost efficiency for concentrated solutions of 2,4-dichlorophenoxyacetic acid (in the order of 10%). The amount of hydrogenated naphtha is in excess of its amount of cyclohexanone (about 1 to 3 parts to 1).

The composition is of advantage in that it provides an effective contact media for bringing the 2,4-dichlorophenoxyacetic acid into contact with the foliage of the plant and from which it is readily absorbed into the plant tissue.

Example II

| | Percent |
|---|---|
| 2,4-dichlorophenoxyacetic acid | 10 |
| Diacetone alcohol | 88 |
| N,N-diethylcyclohexylammonium "Lorol" sulfate | 2 |

This example illustrates how a water-miscible or water-soluble solvent may be utilized in forming a colloidal dispersion of 2,4-dichlorophenoxyacetic acid in water rather than an emulsion as in Example I. When the composition is poured or stirred into water the 2,4-dichlorophenoxyacetic acid is precipitated in especially finely divided form and dispersed by the dispersing agent, N,N-diethylcyclohexylammonium "Lorol" sulfate. A very stable dispersion suitable for applying 2,4-dichlorophenoxyacetic acid to foliage is obtained.

Example III

| | Percent |
|---|---|
| 2,4-dichlorophenoxyacetic acid | 10 |
| Diacetone alcohol | 85 |
| Carbowax 1500 | 5 |

This composition forms a colloidal dispersion similar to that obtainable with the composition of Example II and may be used when a less stable dispersion is desired.

In place of 2,4-dichlorophenoxyacetic acid in the above examples there may be substituted other active plant regulant herbicides, such as 2- or 4-chlorophenoxyacetic acid and 2,4,5-trichlorophenoxyacetic acid.

In place of the mixed solvent in Example I and diacetone alcohol in Examples II and III there may be substituted other water-insoluble and water-miscible or water-soluble solvents such as cyclohexanone, methanol, ethanol, toluene and xylene. In place of N,N-diethylcyclohexylammonium "Lorol" sulfate and Carbowax 1500 there may be substituted other dispersing agents soluble in the solvent, as, for example, laurylpyridinium oleate, piperidine oleate, triethanolamine oleate and condensation products of ethylene oxide and fatty acids.

The proportions may be varied but in order that full advantage of the invention may be obtained it is desirable to use from 5 to 25% of 2,4-dichlorophenoxyacetic acid, 2 to 10% dispersing agent, and the balance mutual solvent.

By means of the compositions described and illustrated above aqueous dispersions may be prepared simply and effectively for applying the plant regulant herbicide to foliage.

I claim:

1. A composition of matter, useful as a plant regulant herbicide, consisting predominantly of 5 to 25% of 2,4-dichlorophenoxyacetic acid, 2 to 10% of N,N-diethylcyclohexylammonium "Lorol" sulfate, and the balance substantially all composed of a mixture of cyclohexanone and hydrogenated naphtha.

2. A composition of matter, useful as a plant regulant herbicide, consisting predominantly of 5 to 25% of 2-4-dichlorophenoxyacetic acid, 2 to 10% of N,N-diethylcyclohexylammonium "Lorol" sulfate, and the balance substantially all composed of a mixture of cyclohexanone and hydrogenated naphtha in the proportions of 1 to 3 parts of hydrogenated naphtha for each part of cyclohexanone.

3. A composition of matter, useful as a plant regulant herbicide, consisting predominantly of 5 to 25 parts by weight of 2,4-dichlorophenoxyacetic acid, 2 to 10 parts by weight of a dispersing agent, and the balance a mutual solvent for the 2,4-dichlorophenoxyacetic acid and the dispersing agent consisting of a mixture of cyclohexanone and hydrogenated naphtha.

ALBERT L. FLENNER.

REFERENCES CITED

The following references are of record in the file of this patent:

UNITED STATES PATENTS

| Number | Name | Date |
|---|---|---|
| 2,007,433 | Melhus | July 9, 1935 |
| 2,160,929 | Warner et al. | June 6, 1939 |
| 2,188,734 | Carswell | Jan. 30, 1940 |
| 2,277,744 | Cupery et al. | Mar. 31, 1942 |
| 2,390,941 | Jones | Dec. 11, 1945 |